United States Patent [19]

Pries

[11] 3,996,109

[45] Dec. 7, 1976

[54] COKE OVEN BATTERY HAVING TWIN HEATING FLUES

[75] Inventor: Erich Pries, Bochum, Germany

[73] Assignee: Dr. C. Otto & Comp. G.m.b.H., Bochum, Germany

[22] Filed: June 2, 1975

[21] Appl. No.: 583,036

[30] Foreign Application Priority Data

June 5, 1974 Germany .......................... 2427032

[52] U.S. Cl. .............................. 202/141; 202/142; 202/143; 202/144

[51] Int. Cl.² ..................... C10B 5/12; C10B 5/14; C10B 21/06; C10B 21/10

[58] Field of Search .......................... 202/141–144, 202/151, 222, 223; 110/24

[56] References Cited

UNITED STATES PATENTS

| | | | |
|---|---|---|---|
| 1,891,700 | 12/1932 | Wessel | 202/151 |
| 1,967,975 | 7/1934 | Schaefer | 202/143 |
| 3,054,728 | 9/1962 | Schmidt et al. | 202/151 |
| 3,170,851 | 2/1965 | Van Ackeren | 202/144 |
| 3,183,175 | 5/1965 | Brettbach et al. | 202/141 |
| 3,366,372 | 1/1968 | Palumbo | 202/143 |
| 3,801,470 | 4/1974 | Knappstein et al. | 202/142 |

*Primary Examiner*—Morris O. Wolk
*Assistant Examiner*—Bradley Garris
*Attorney, Agent, or Firm*—Brown, Murray, Flick & Peckham

[57] ABSTRACT

Regenerative heating of a coke oven battery includes the combustion of lean gas and air in heating chambers disposed between the coking chambers or, alternatively, if desired, the combustion of rich gas and air in the heating chambers. Each heating chamber includes a plurality of header walls forming upgoing and downgoing heating flues. Each header wall includes at least one internal duct in open communication with a plurality of vertically-spaced exit ports at the common side of a header wall. The internal ducts receive either preheated air or preheated lean gas for combustion in a heating flue. The cross-sectional size of the exit ports to discharge air in a given heating flue increases upwardly from port to port along the header wall whereby the amount of air supplied at the sole and lower part of the heating flue is insufficient for complete combustion of the amount of lean gas supplied thereto. The cross-sectional sizes of the plurality of exit ports for lean gas in the same heating flue decrease upwardly from port-to-port along the header wall such that the amounts of air and lean gas supplied to the heating flue are sufficient for complete combustion of the smoke gas discharged from the heating flue. In one embodiment, each header wall includes two internal ducts with the discharge ports thereof in open communication with different heating flues. In a further embodiment, each header wall includes a single internal duct having exit ports at opposite sides. Combustion takes place in all the heating flues which are upgoing and located at one side of the oven chamber. A top duct interconnects all the upgoing flues with downgoing heating flues located at the other side of the oven chamber during a regenerative half-cycle.

4 Claims, 9 Drawing Figures

COKE OVEN BATTERY HAVING TWIN HEATING FLUES

BACKGROUND OF THE INVENTION

This invention relates to a coke oven battery which is regeneratively heated by the combustion of lean gas and air in a heating chamber disposed between two coking chambers and divided into vertically-extending upgoing and downgoing heating flues by header walls, and more particularly, to such a coke oven battery wherein the header walls are coupled to air supply means and alternate along the row of heating flues with header walls coupled to lean gas supply means.

In coke ovens of this general type, special problems arise which relate inter alia to the difficulty of achieving the uniform vertical heating of the coal charge in the coke oven chambers. In this regard, coke ovens have been constructed in a manner whereby fuel gas which is not preheated is supplied at the sole of the heating flues and the air is supplied through header flues having a plurality of exit ports disposed at different heights such that the size of the ports increase in the upward direction.

It is also known in the prior art to supply a coke oven battery with lean gas through header flues having vertically-graded exits. Part of the heating gas together with the total quantity of air for combustion is supplied with a change of draught at the base of the upgoing heating flues while all the header flues are constantly fed with lean gas. The bottom ends of the heating flues and along the greater part of these flues, therefore, have a constant excess of air which is available for combustion with the lean gas supplied through the header flues even in the downgoing heating flue.

Recent efforts have been made to insure that the smoke gases which are discharged from the heating system of coke ovens have the lowest possible content of nitrogen oxides. The present invention is addressed to solving this problem and more particularly by providing an arrangement of parts which insures that the presence of nitrogen contained in the combustion air is at a minimum, particularly in the zones of maximum heat development in such a way that there is the least possible amount of oxygen supplied which is not immediately combined with the constituents of the fuel gas. The other long-standing problem of heating the charge of coal in the oven chambers as uniformly as possible over its entire height is also solved according to the present invention.

SUMMARY OF THE INVENTION

The solution to these problems is brought forth according to the present invention by providing a particular arrangement to the cross-sectional size of the exit ports for the two combustion media discharged into a heating wall in a coke oven wherein the exit ports are formed in header flues that alternatively supply air and lean gas to the row of heating flues and that the exit ports are so dimensioned such that the amount of air supplied to a header flue increases upwardly thereof and the amount of lean gas supplied to the header flue increases downwardly. The dimension of the exit ports is so selected that the amount of air supplied to the bottom end of the heating flues and to the bottom portion thereof is insufficient for complete combustion of the amount of gas supplied while complete combustion of the lean gas is insured for the smoke gas which is discharged from the heating flues.

This construction and arrangement of parts can be modified in such a way that grading to the cross-sectional size of the exit ports is applied to only one of the combustion media of lean gas and air but to such a degree that the amount of air supplied to the bottom end of the heating flues and to the lower part thereof is insufficient for complete combustion of the amount of gas supplied while insuring the complete combustion of lean gas before the smoke gas is discharged from the heating flues.

Two internal passageways in each of the header walls can be coupled with two supply means for the same combustion media and discharge apertures open out of opposite sides of each header wall for supplying such media to adjacent heating flues.

The present invention is applicable to different arrangements of upgoing and downgoing heating flues which are interconnected with each other for draught changeovers. The row of heating flues may be divided to provide the so-called half-divided oven battery wherein the heating flues disposed on the coking side of the oven battery are upgoing heating flues in one-half cycle and the smoke gases are supplied through a horizontal top duct to the heating flues on the machine side of the coke oven battery. In this way, the heating flues which are situated at the machine side after the draught reversal will be upgoing flues. Other arrangements of heating flues are possible, for example, in twin flues where an upgoing flue communicates with an adjacent flue in an alternate draught pattern. Smaller or larger groups of heating flues can be combined for the draught reversals.

When the oven battery is constructed for compound heating, i.e., heating by rich gas in addition to heating by regeneratively preheated lean gas and when the jets for such heating media are situated at or close to the sole of the heating flues, regulating elements are provided according to the present invention for the vertical adjustment of the rich gas flame. These regulating elements are disposed at the entry of the regenerator sole flues. Since the discharge ports supplied with lean gas have a larger cross section along the header flues at a position which is lower than the ports in the header flues which discharge air when heating with lean gas, it is, therefore, possible to control the position of the flame produced by the combustion of rich gas in either higher or lower locations in the heating flues by unequal biasing of two groups of regenerators through control of the air regulator elements for the sole flues.

These features and advantages of the present invention as well as others will be more readily understood when the following description is read in light of the accompanying drawings, in which.

Figure 1:
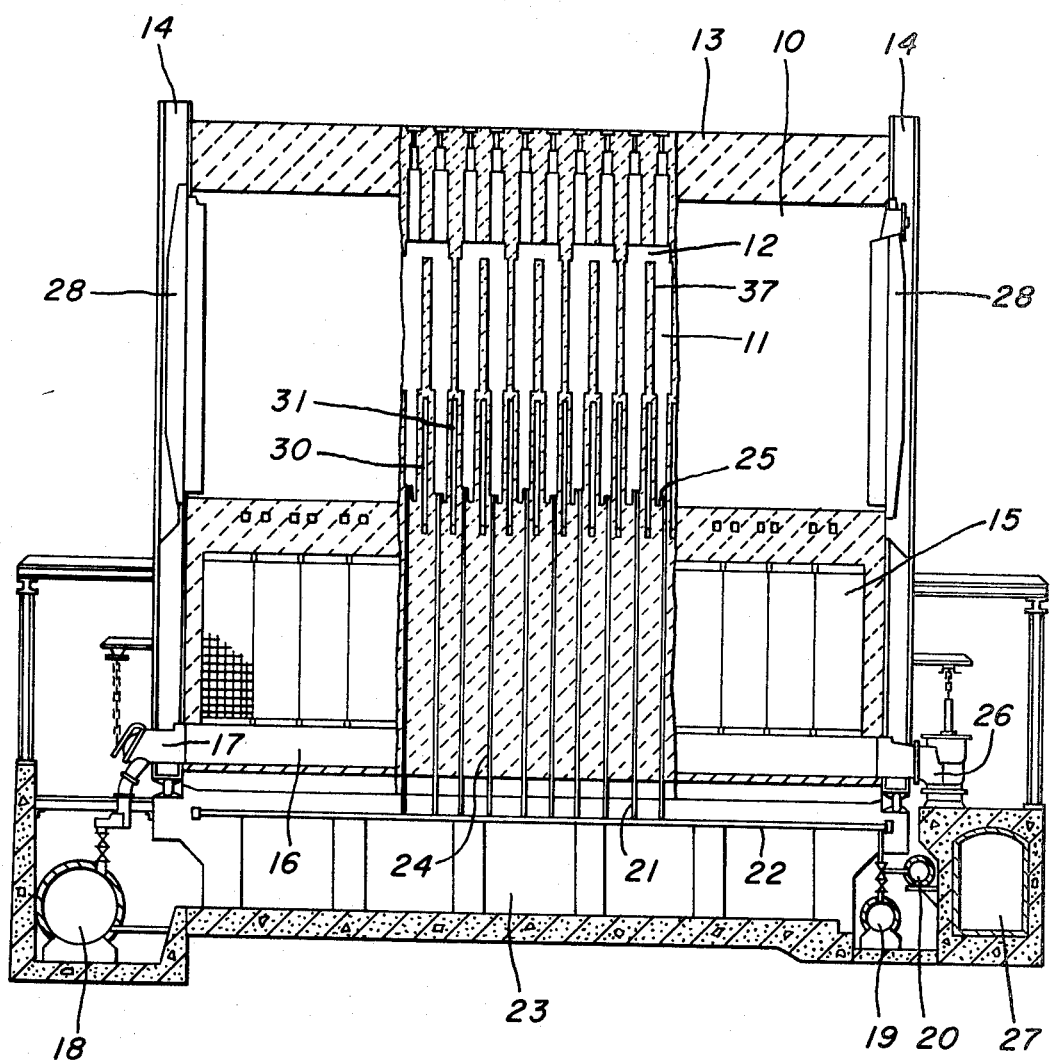
FIG. 1 is an elevational view illustrating different sections through an underjet type of regeneratively heated coke oven chamber forming one of a battery of coke oven chambers.

In the following description, the same reference numerals have been applied to identical parts employed in a twin-flue type of oven battery which is shown in FIGS. 1–5 and a half-divided flue arrangement for an oven battery which is shown in FIGS. 6–9. Coke oven chambers 10 alternate with heating chambers along the length of the coke oven battery. The ends of the coke oven chambers are closed by doors 28. An oven roof 13 is provided for the coke oven chambers and buckstays 14 are used to support the oven masonry. Regenerators 15 extend below the coking chambers and sole flues 16 extend below the regenerators in a gaseous conducting relation therewith. Air flaps 17 are provided at the inlet to the sole flues to control the air supplied thereto. Certain ones of the sole flues 16 are connected to a lean gas distribution duct 18. A distribution duct 19 is provided for the supply of rich gas which is combined with compressed air supplied through pipeline 20 for degraphitizing the rich gas. Distribution pipes 22 extend horizontally within a basement 23. Pipes 21 are connected to the distribution pipes 22. Pipes 21 are, in turn, connected to rich gas supply pipes 24 which pass through the regenerator bulkheads from where pipes 24 extend into jets 25 which are situated at the base of the heating flues 11. The regenerator sole flues 16 are connected via waste heat valves 26 to a smoke gas collecting flue 27.

Figure 2:
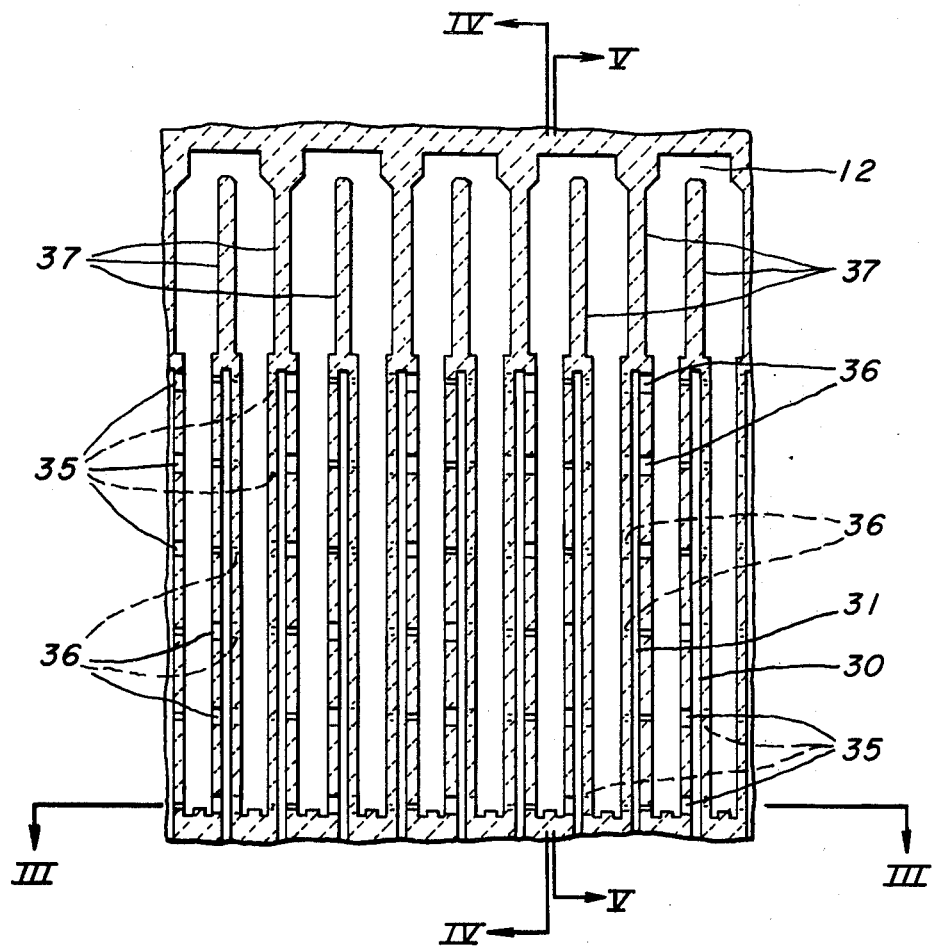
FIG. 2 is an enlarged view of the twin-heating flue system shown in FIG. 1.

Twin-heating flues are illustrated in FIGS. 1 and 2. It is clearly apparent that at the tops of an upgoing heating flue and a downgoing heating flue they are interconnected through a port 12. In contrast to this flue arrangement and as illustrated in FIG. 6, in a half-divided oven battery, all the heating flues 11 communicate with a top horizontal duct 33.

Figure 3:
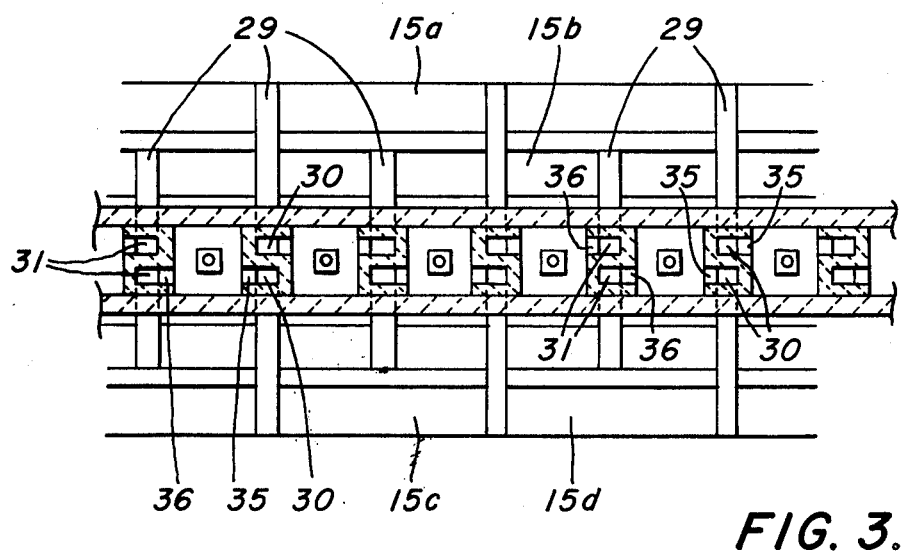
FIG. 3 is a sectional view taken along line III—III of FIG. 2.
Figure 4:
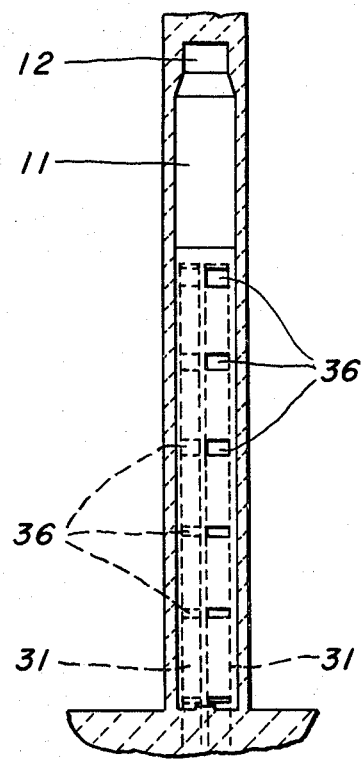
FIG. 4 is a sectional view taken along line IV—IV of FIG. 2.
Figure 5:
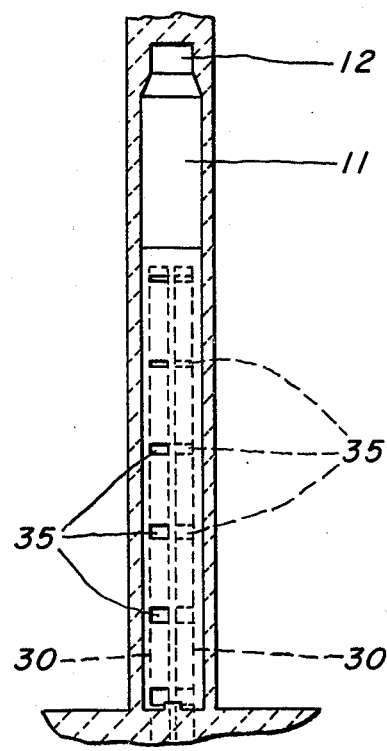
FIG. 5 is a sectional view taken along line V—V of FIG. 2.
Figure 8:
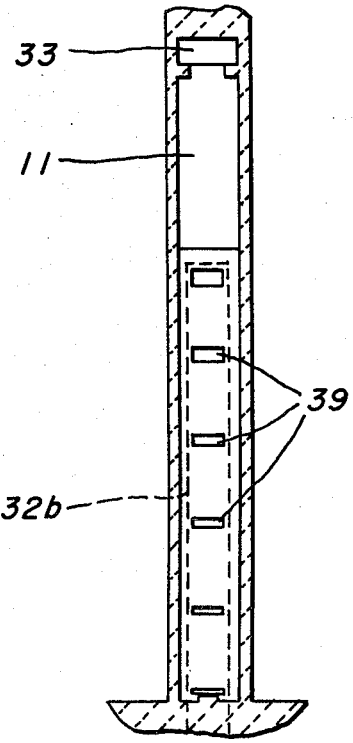
FIG. 8 is a sectional view taken along line VIII—VIII of FIG. 6.

In both of these types of coke ovens according to the present invention, the heating flues are defined by header walls 37 that are provided with header flues for separately supplying lean gas and air through discharge apertures opening into adjacent heating flues. The discharge apertures or ports in each header wall are located at different heights. The twin-flue arrangement shown in FIGS. 2–5 for an oven battery is provided with header walls 37 between the flues of the same pair. For each twin flue, one of the header walls defines a header flue 31 including an internal duct for supplying air within the header walls separating adjacent pairs of the twin flues. Header flues 30 have internal ducts in a remaining header wall of a given pair of twin flues for supplying preheated lean gas. Exit ports opening out of both of the header flues 30 and 31 extend to adjacent heating flues. A plurality of exit ports 35 opens out of each header flue 30 for discharging preheated lean gas and the cross-sectional size of these exit ports decreases from port-to-port upwardly along each header wall. A plurality of exit ports 36 for preheated air has cross-sectional sizes which increase from port-to-port upwardly along the header wall. FIG. 3 illustrates the manner by which two header flues 30 in each header wall are connected by sloping supply ducts 29 to a lean gas regenerator 15a or 15c and two header flues 31 in each header wall are connected to regenerator 15b or 15d that supplies preheated air. These regenerators cooperate in pairs, i.e., 15a, 15b and 15c, 15d, in the draught changeover pattern.

Figure 9:
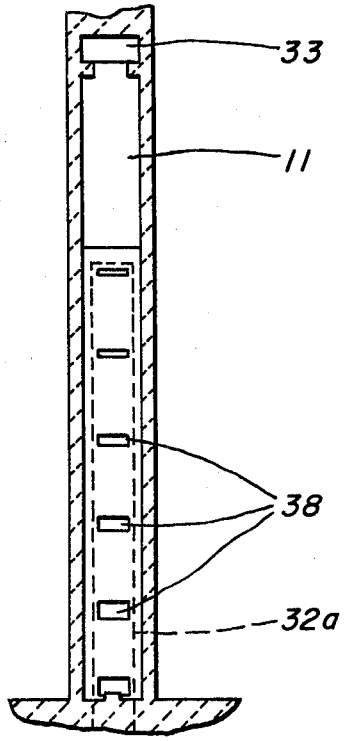
FIG. 9 is a sectional view taken along line IX—IX of FIG. 6.
Figure 6:
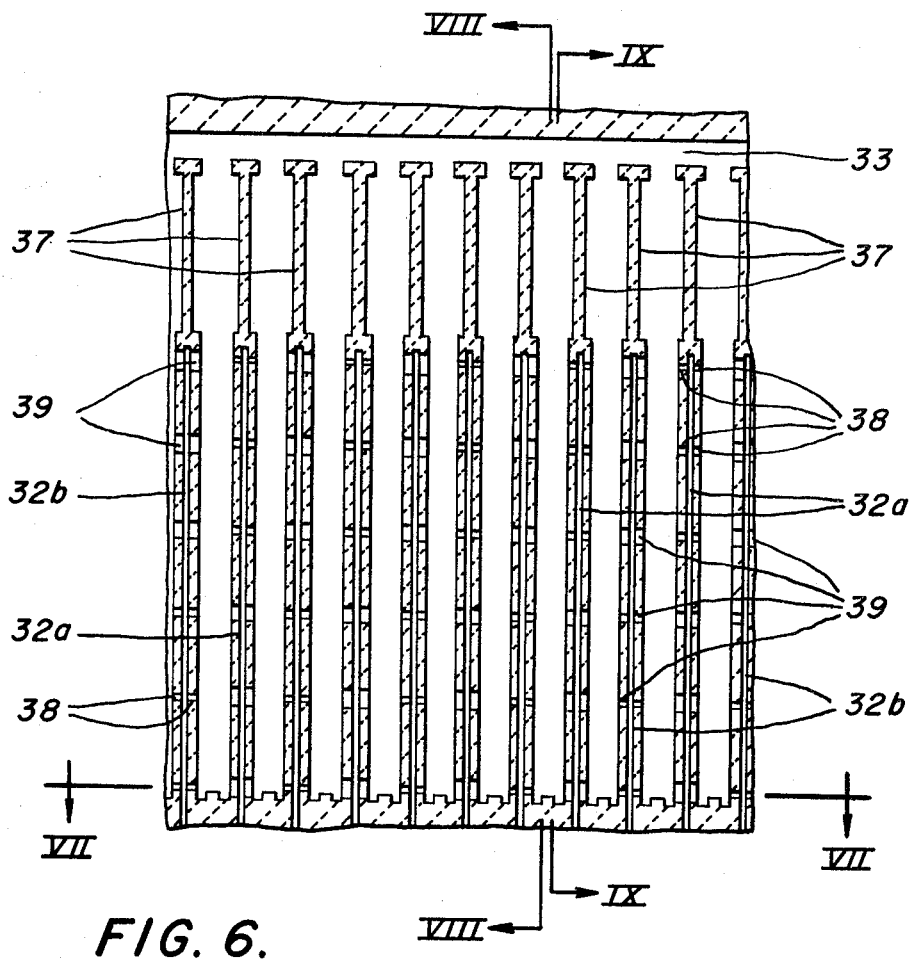
FIG. 6 is an elevational view similar to the portion of the heating flues shown in FIG. 2 but illustrating a portion of a row of adjacent heating flues of a so-called half-divided oven battery.
Figure 7:
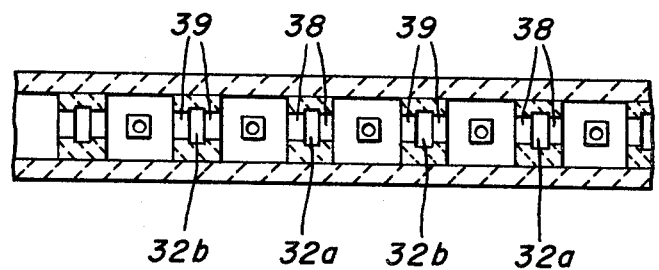
FIG. 7 is a sectional view taken along line VII—VII of FIG. 6.

While each header wall in the twin-flue arrangement is provided with two header flues 30 and 31, in a half-divided flue arrangement for a battery of coke ovens as illustrated in FIGS. 6 and 9, only a single header flue 32a is provided for the supply of preheated lean gas and a single header flue 32b is provided for conducting preheated air in each header wall. Header flue 32a communicates with a plurality of exit ports 38 and header flue 32b communicates with a plurality of exit ports 39. The exit ports 38 are situated on both sides of the header wall forming header flues 32a and the exit ports 39 are situated on both sides of the header wall forming the header flue 32b. As clearly shown in FIGS. 8 and 9, the cross-sectional size of the ports 38 decreases from port-to-port in the upward direction and the cross-sectional size of the ports 39 increases from port-to-port in the upward direction. As is also apparent from the drawings, the header walls have a thinner cross section along the length thereof which extends at an elevation above the exit ports.

In both types of heating flue arrangements as herein described, compound heating of the coking chambers is achieved by the use of jets 25 to discharge rich gas into upgoing heating flues. These jets extend through the regenerator without preheating the rich gas during the heating half-cycle. The individual regenerators used to regeneratively preheat lean gas when heating by the combustion of air and lean gas, are used further to supply preheated air for heating an oven chamber by the combustion of rich gas and air. The sole flues for these regenerators have regulator flaps 17 at the inlet of the sole flues which form means for adjustably controlling the height of the flame occurring by the combustion of rich gas and preheated air.

From the foregoing description, it is believed now apparent to those skilled in the art that the stepped arrangement to the cross-sectional size of the exit ports 35 and 36 as well as exit ports 38 and 39 insures that there is an excess of gas in the bottom part of the heating flues while at the same time it also insures that sufficient quantities of air are supplied to insure complete combustion of the lean gas only in the top portion of the heating flues. In this way, there is a complete combustion of the smoke gas which is discharged from heating flues.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A coke oven battery of the type heated regeneratively by the combustion of lean gas and air, comprising the combination of:
    horizontally-spaced coking chambers with vertically-extending heating walls at the sides of each coking chamber, two of said heating walls forming a heating chamber in the space between adjacent coking chambers,
    a plurality of header walls subdividing each heating chamber into a plurality of separate twin heating flues with successively arranged pairs of upgoing and downgoing heating flues being arranged along each of said coking chambers, each of said header walls having two separate internal ducts separately communicating with a plurality of vertically-spaced exit ports arranged along opposite sides of each header wall such that air and lean gas are supplied from said exit ports into only the upgoing heating flues of each twin heating flue, air and lean gas supply means separately coupled to said internal ducts in the header walls in a manner such that air and lean gas are separately supplied to separate ducts for each twin heating flue, the plurality of exit ports discharging air into upgoing heating flues of each twin flue having cross-sectional sizes that increase upwardly along the header wall from port-to-port, and means to control the amount of air supplied into the internal ducts of said upgoing heating flues to effect incomplete combustion of the lean gas at the sole and lower part of the upgoing heating flues and complete combustion of smoke gas discharged from the twin heating flues.

2. The coke oven battery according to claim 1 wherein the two internal ducts in one header wall of a twin flue are separately connected to different regenerators forming said air supply means and wherein two internal ducts in the remaining header wall of a twin flue are separately connected to other regenerators forming said lean gas supply means.

3. The coke oven battery according to claim 1, the combination further comprising a plurality of jets for discharging rich gas through the soles of said heating flues essentially without preheating for combustion within upgoing heating flues of each twin heating flue during a heating half-cycle, first regenerator means for alternatively preheating air when heating an oven chamber by the combustion of air and lean gas, second regenerator means for alternatively preheating lean gas when heating an oven chamber by the combustion of lean gas and air, said second regenerator means being arranged and constructed to further supply preheated air for heating a coking chamber by the combustion of rich gas and air, and sole flues for said first and second regenerator means, said means to control including regulator means at the inlet of the sole flues for said first regenerator means for adjustably controlling the flame produced by the combustion of rich gas and preheated air within each twin heating flue.

4. The coke oven battery according to claim 1 wherein said plurality of exit ports to feed lean gas into upgoing flues of said twin heating flues have cross-sectional sizes that progressively decrease upwardly along header walls from port-to-port, and means to control the amount of lean gas supplied to upgoing flues of said twin heating flues in relation to the amount of air supplied at the sole and lower part of the upgoing heating flues for incomplete combustion of the amount of gas supplied thereto while the amounts of air and lean gas supplied thereabove are controlled by said control means and the sizes of said exit ports to thereby insure complete combustion of smoke gas discharged from each twin heating flue.

* * * * *